(12) United States Patent
Luo et al.

(10) Patent No.: US 11,470,547 B2
(45) Date of Patent: Oct. 11, 2022

(54) ACCESS SELECTION METHOD AND APPARATUS

(71) Applicant: ZTE CORPORATION, Guangdong (CN)

(72) Inventors: Wei Luo, Guangdong (CN); Lin Chen, Guangdong (CN)

(73) Assignee: ZTE CORPORATION ( * ) Notice: Subject to any disclaimer, the term of this patent is extended or adjusted under 35 U.S.C. 154(b) by 29 days.

(21) Appl. No.: 17/042,266

(22) PCT Filed: Apr. 3, 2019

(86) PCT No.: PCT/CN2019/081281
§ 371 (c)(1),
(2) Date: Sep. 28, 2020

(87) PCT Pub. No.: WO2019/192524
PCT Pub. Date: Oct. 10, 2019

(65) Prior Publication Data
US 2021/0051579 A1 Feb. 18, 2021

(30) Foreign Application Priority Data
Apr. 4, 2018 (CN) .......................... 201810301414.6

(51) Int. Cl.
H04W 48/20 (2009.01)
H04W 76/11 (2018.01)
(Continued)

(52) U.S. Cl.
CPC .......... *H04W 48/20* (2013.01); *H04W 16/28* (2013.01); *H04W 24/08* (2013.01); *H04W 24/10* (2013.01);
(Continued)

(58) Field of Classification Search
CPC ..... H04W 48/20; H04W 16/28; H04W 24/08; H04W 24/10; H04W 40/22; H04W 48/16;
(Continued)

(56) References Cited

U.S. PATENT DOCUMENTS

| 10,779,329 | B2* | 9/2020 | Gao | ..................... H04L 5/006 |
| 2014/0269417 | A1* | 9/2014 | Yu | ..................... H04L 41/0803 |
| | | | | 370/254 |

(Continued)

FOREIGN PATENT DOCUMENTS

| CN | 102088756 A | 6/2011 |
| CN | 106034343 A | 10/2016 |

(Continued)

OTHER PUBLICATIONS

Samsung, "Deployment Scenarios for Integrated Access and Backhaul." 3GPP TSG RAN WG1 NR Ad-Hoc#2 R1-1711615, Jun. 30, 2017. (Jun. 30, 2017).

(Continued)

*Primary Examiner* — Said M Elnoubi
(74) *Attorney, Agent, or Firm* — McDonald Hopkins LLC

(57) ABSTRACT

Provided is an access selection method. The method includes the following steps: a first transmission node receives configuration information of one of a parent node or a neighboring cell, and the first transmission node performs a measurement, monitoring, or a selection on an accessed parent node according to the configuration information. Further provided is an access selection apparatus, an electronic apparatus and a storage medium.

14 Claims, 3 Drawing Sheets

First transmission node receives configuration information of one of a parent node or a neighboring cell — 302

The first transmission node performs a measurement, monitoring, or a selection on an accessed parent node according to the configuration information — 304

(51) Int. Cl.
| | |
|---|---|
| *H04W 76/27* | (2018.01) |
| *H04W 16/28* | (2009.01) |
| *H04W 24/08* | (2009.01) |
| *H04W 24/10* | (2009.01) |
| *H04W 40/22* | (2009.01) |
| *H04W 48/16* | (2009.01) |
| *H04W 72/04* | (2009.01) |
| *H04W 88/14* | (2009.01) |

(52) U.S. Cl.
CPC ........... *H04W 40/22* (2013.01); *H04W 48/16* (2013.01); *H04W 72/0426* (2013.01); *H04W 72/0446* (2013.01); *H04W 72/0453* (2013.01); *H04W 76/11* (2018.02); *H04W 76/27* (2018.02); *H04W 88/14* (2013.01)

(58) Field of Classification Search
CPC ......... H04W 72/0426; H04W 72/0446; H04W 72/0453; H04W 76/11; H04W 76/27; H04W 88/14; H04W 40/24; H04W 48/08
See application file for complete search history.

(56) References Cited

U.S. PATENT DOCUMENTS

| | | | |
|---|---|---|---|
| 2018/0092139 A1 | 3/2018 | Novlan et al. | |
| 2019/0150220 A1* | 5/2019 | Byun ................... | H04W 76/10 370/329 |

FOREIGN PATENT DOCUMENTS

| | | |
|---|---|---|
| CN | 106162764 A | 11/2016 |
| CN | 106211026 A | 12/2016 |
| CN | 107852363 A | 3/2018 |
| EP | 3280183 A1 * | 2/2018 ........... H04W 40/24 |
| EP | 3280183 A1 | 2/2018 |
| WO | 2017028756 A1 | 2/2017 |

OTHER PUBLICATIONS

English Translation of International Search Report dated Jun. 27, 2019; International Patent Application No. PCT/CN2019/081281 filed on Apr. 3, 2019. ISA/CN.
Quaolcomm Incorporated: "IAB—Control-plane Aspects," 3GPP Draft; R2-1800414 IAB Control Plane Aspects, 3rd Generation Partnership Project (3GPP), Jan. 26, 2018.
LG Electronics Inc: "Consideration on route selection," 3GPP Draft; R2-1801402, Consideration on route selection, 3rd Generation Partnership Project (3GPP), Jan. 26, 2018.
"3rd Generation Partnership Project; Technical Specification Group Radio Access Network; Study on Integrated Access and Backhaul; (Release 15)", 3GPP Standard; Technical Report; DGPP TR 38.874, 3rd Generation Partnership Project (3GPP), Nov. 7, 2018.
Extended European Search Report dated Dec. 6, 2021. European Patent Application No. 19781779.4.
Office Action dated Oct. 14, 2020. Canadian Patent Application No. 3095500.
Office Action dated Jun. 23, 2021. Australian Patent Application No. 2019249622.
3 GPP TSG-RAN3 Meeting #99, "On RAN architecture for IAB relaying in NR;:" Intel Corporation. Athens, Greece. (2018).
Chinese Office Action dated Jun. 15, 2022; Chinese Patent Application No. 201810301414.6.
Chinese Search Report dated Jun. 9, 2022; Chinese Patent Application No. 201810301414.6.
Australian Notice of Acceptance dated Jun. 15, 2022; Australian Patent Application No. 2019249622.

* cited by examiner

ACCESS SELECTION METHOD AND APPARATUS

CROSS-REFERENCE TO RELATED APPLICATIONS

This application is a 35 U.S.C. 371 national stage filing of PCT Application No. PCT/CN2019/081281, filed on Apr. 3, 2019, which claims priority to Chinese Patent Application No. 201810301414.6 filed on Apr. 4, 2018 with the CNIPA, the content of which is incorporated herein by reference in their entireties.

TECHNICAL FIELD

The present disclosure relates to the field of communications, for example, to an access selection method and apparatus.

BACKGROUND

As wireless multimedia traffics develop, demands of people for high data rates and better user experience are increasing, so that high requirements for system capacity and coverage of traditional cellular networks are imposed. In the related art, in order to increase network capacity and improve coverage and to consider the requirements of cell deployment flexibility, a relay link supporting wireless backhaul transmission is proposed to implement dense network deployment. The node that supports the relay function is referred to as a Relay Node (RN). The RN provides a User Equipment (UE) accessing a cell of the RN with functions and services similar to an ordinary Evolved Node Base Station (eNB). A wireless interface between the RN and the UE is referred to as an Access Link (AL). The RN accesses a base station eNB serving the RN through the wireless interface in a manner similar to an ordinary UE. The eNB that serves the RN is referred to as a Donor eNB (DeNB). The wireless interface between the RN and the DeNB is referred to as a Backhaul Link (BL).

As the future communication technology supports a larger bandwidth and supports a larger-scale multi-antenna or multi-beam transmission, convenient conditions are provided for the implementation of a relay that a backhaul link and an access link share an air interface resource, such relay being referred to as an Integrated Access Backhaul (IAB). To further improve the flexibility of the deployment, the ordinary IAB does not need to be directly connected to a core network. Only an IAB donor is directly connected to the core network. Therefore, the ordinary IAB can communicate with the core network only by transmitting data to the IAB donor. With reference to FIG. 1, IAB node A is connected to the core network through optical fiber and IAB node A is an IAB donor, while IAB nodes B and C are not connected to the core network and they are ordinary IABs.

To further improve the flexibility of the deployment, with reference to FIG. 2, an IAB can transmit data to an IAB donor via multiple IABs as relays. In other words, IABs are hierarchical. The so-called IAB hierarchies represent the number of IAB hops for transmission from the IAB to the IAB donor. It is assumed that the hierarchy of the donor IAB is 0 and that the hierarchy of the IAB accessed by the UE is N, and then a transmission path between the UE and the core network is to sequentially pass through the IABs of hierarchies 1, 2, . . . , N. It is assumed that the process of setting up a connection between IABs is similar to the process of setting up a connection between a UE and a base station, and then an IAB of hierarchy (n+1) is a UE for an IAB of hierarchy n, and the IAB of hierarchy n is a serving cell for the IAB of hierarchy n. If the IAB of hierarchy (n+1) is connected to the IAB of hierarchy n through a Uu port in the way of a UE, the IAB of hierarchy n is referred to as a parent node of the IAB of hierarchy (n+1), and the IAB of hierarchy (n+1) is a child node of the IAB of hierarchy n.

However, in an IAB multi-hop network in the related art, during a communication between a UE and a core network through multiple IABs, there is no reasonable IAB selection method, resulting in a large communication delay and a large overhead. For this, no effective scheme has been proposed.

SUMMARY

Embodiments of the present disclosure provide an access selection method and apparatus, so as to at least solve a large communication delay and a large overhead in the related art due to the fact that there is no reasonable IAB selection method during a communication between a UE and a core network through multiple IABs.

According to an embodiment of the present disclosure, an access selection method is provided. The method includes the following steps: a first transmission node receives configuration information of one of a parent node or a neighboring cell; and the first transmission node performs a measurement, monitoring, or a selection on an accessed parent node according to the configuration information.

According to another embodiment of the present disclosure, an access selection method is provided. The method includes the following steps: a UE receives cell priority information, cell hierarchy information, or IAB donor information; the UE performs a measurement or a cell reselection according to the cell priority information, the cell hierarchy information or the IAB donor information. The IAB donor information includes at least one of the following: a number of connection hops, a hierarchy, a path overhead, a load, or congestion. An IAB donor corresponding to the IAB donor information includes an IAB base station or an IAB donor Distributed Unit (DU).

According to another embodiment of the present disclosure, an access selection apparatus is provided and is applied to a transmission node. The apparatus includes a reception module and a selection module. The reception module is configured to receive configuration information of one of a parent node or a neighboring cell, and the selection module is configured to perform a measurement, monitoring, or a selection on an accessed parent node according to the configuration information.

According to another embodiment of the present disclosure, an access selection apparatus is provided and is applied to a UE. The apparatus includes a reception module and a selection module. The reception module is configured to receive cell priority information, cell hierarchy information or IAB donor information, and the selection module is configured to perform a measurement or a cell reselection according to the cell priority information, the cell hierarchy information or the IAB donor information.

The IAB donor information includes at least one of the following: a number of connection hops, a hierarchy, a path overhead, a load, or congestion. An IAB donor corresponding to the IAB donor information includes an IAB base station or an IAB donor DU.

According to another embodiment of the present disclosure, a storage medium is further provided. The storage medium is configured to store a computer program. The computer program is configured to, when executed, perform the method of any one of the above-mentioned embodiments.

According to another embodiment of the present disclosure, an electronic apparatus is further provided, and includes a memory and a processor. The memory is configured to store a computer program, and the processor is configured to execute the computer program to perform the method of any one of the above-mentioned embodiments.

BRIEF DESCRIPTION OF DRAWINGS

The drawings described herein are used for providing an understanding of the present disclosure, and form a part of the present application. The exemplary embodiments and descriptions thereof in the present disclosure are used for explaining the present disclosure and do not limit the present disclosure in any improper way.

DETAILED DESCRIPTION

The present disclosure will be described hereinafter in detail with reference to the drawings in conjunction with embodiments. If not in collision, the embodiments described in the present application and the features thereof may be combined with each other.

The terms "first", "second" and the like in the description, claims and the above drawings of the present disclosure are used for distinguishing between similar objects and are not necessarily used for describing a particular order or sequence. In addition, as for an IAB donor, in a scenario where a Centralized Unit (CU) and a DU are not separated, the donor may be referred to as an IAB donor or a donor base station. In a scenario where the CU and the DU are separated, in an embodiment, an IAB donor refers to an IAB donor DU, the IAB donor DU refers to a DU in a wireline connection, and the IAB donor DU may be in a wireline connection to the IAB donor CU. The IAB donor DU and the IAB donor CU may be built-in together, or may be simply in a wireline connection, in which case one IAB donor CU may be in a wireline connection to multiple IAB donor DUs.

Embodiment One

Figure 1:
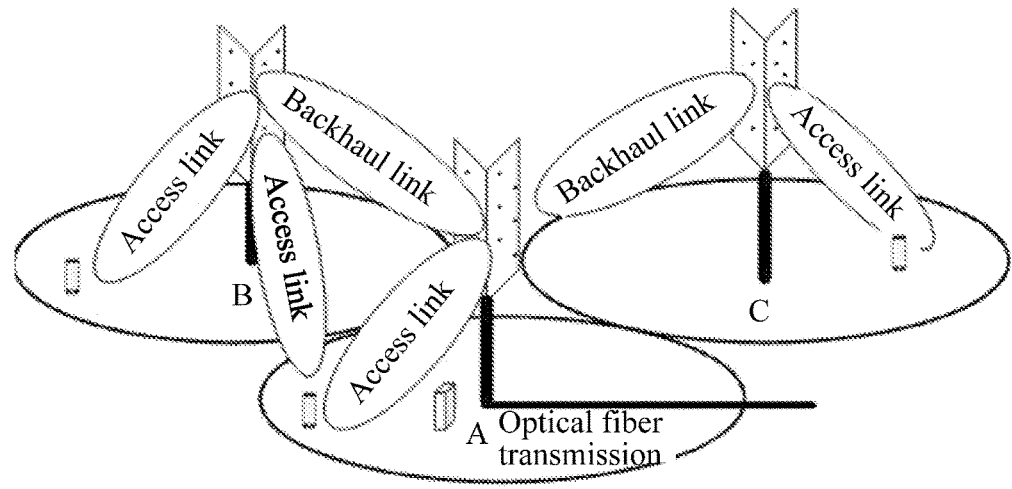
FIG. 1 is a schematic diagram of an IAB link in the related art.
Figure 2:
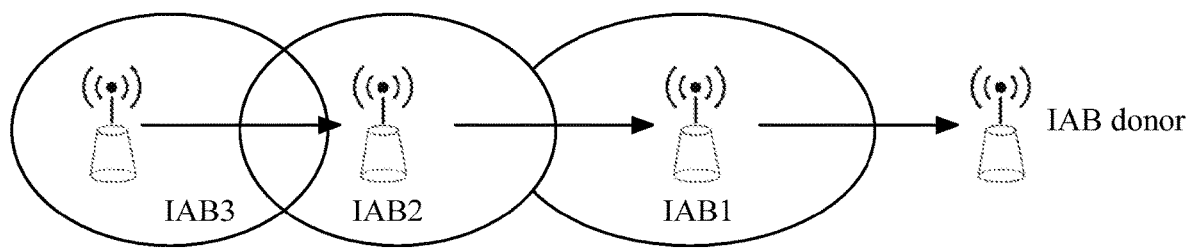
FIG. 2 is a schematic diagram illustrating a multi-hop backhaul of IAB nodes in the related art.
Figure 3:
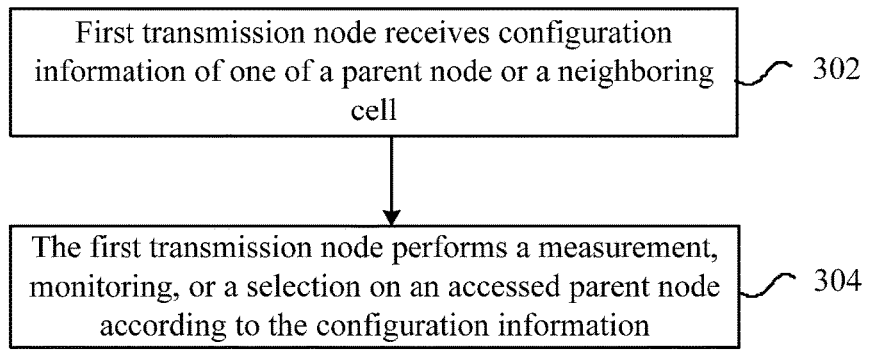
FIG. 3 is a flowchart of an access selection method according to an embodiment of the present disclosure.

In this embodiment, an access selection method executed on a transmission node is provided. FIG. 3 is a flowchart of an access selection method according to the embodiment of the present disclosure. As shown in FIG. 3, the process includes step 302 and step 304 described below.

In the step 302, a first transmission node receives configuration information of one of a parent node or a neighboring cell.

In an embodiment, the above-mentioned configuration information includes at least one of the following: cell priority information, cell hierarchy information used for indicating the number of hops for reaching an IAB donor, system information, resource configuration information, cell access information, cell selection information, IAB donor information, or IAB information. The IAB donor includes an IAB base station or an IAB donor DU. The IAB donor information or the IAB information includes at least one of the following: the number of connection hops, a hierarchy, a path overhead, a load, congestion, an air interface resource occupancy ratio, a bandwidth, an idle bandwidth, spectral efficiency, or information about remaining bandwidth and throughput of an IAB donor wireless link. The system information includes at least one of the following: a Master Information Block (MIB), minimum System Information (SI), an IAB selection threshold, an IAB reselection offset, an IAB donor identity, the cell priority information, the cell hierarchy information, an IAB access control parameter, an IAB random access parameter, or an IAB access barred indication. The IAB access control parameter includes: an IAB-specific control parameter configured based on one of an IAB-specific access identity or an IAB-specific access level. The IAB random access parameter includes: a resource of IAB sending a preamble, resource information of IAB receiving message (MSG) 2 or MSG 4, a size of an IAB random access response window, random access conflict resolution time. The cell access information includes at least one of the following: the cell priority information or the cell hierarchy information used for indicating the number of hops for reaching the IAB donor. The cell selection information includes at least one of: an IAB selection threshold, an IAB reselection offset, or an IAB donor identity. The IAB donor identity includes: a base station identity (gNB ID), a Number of Global Cell Identifier (NGCI), a Physical Cell Identifier (PCI), a DU ID. The IAB selection threshold includes: a cell measurement selection threshold, a beam measurement selection threshold. The resource configuration information includes at least one of the following: resource information about communications between the first transmission node and a terminal, resource information about communications between the first transmission node and a second transmission node, or resource information about sending the system information by the first transmission node.

In an embodiment, the above-mentioned resource information includes at least one of: time resource information, frequency domain resource information, or space resource information. The time resource information includes at least one of the following: a sub-frame offset and a sub-frame period, a symbol offset and a symbol period, or a slot offset and a slot period. The frequency domain resource information includes at least one of the following: carrier index information, bandwidth part index indication information, or resource block index indication information. The space resource information includes at least one of: beam index indication information or beam direction indication information.

In the step 304, the first transmission node performs a measurement, monitoring, or a selection on an accessed parent node according to the configuration information.

In the present disclosure, the first transmission node receives the configuration information of one of the parent node or the neighboring cell, and the first transmission node performs the measurement, the monitoring, or the selection on the accessed parent node according to the configuration information. That is, the accessed parent node is selected according to the received configuration information, thereby a large communication delay and a large overhead in an IAB multi-hop network in the related art due to the fact that there is no reasonable IAB selection method during a communication between a UE and a core network through multiple IABs are solved, and the effect of reducing the communication delay and the overhead is achieved.

In an embodiment, the first transmission node includes, but is not limited to, an IAB, a relay, or a DU.

In an embodiment, the step 302 and the step 304 may be executed in a reverse order, that is, the step 304 may be executed before the step 302.

In an implementation, the hierarchy of the second transmission node is higher than the hierarchy of the first transmission node; or the second transmission node is a parent node of the first transmission node; or the second transmission node is a serving cell of the first transmission node.

In an embodiment, the step in which the first transmission node receives the configuration information of the neighboring cell includes the step described below.

In step 11, the first transmission node receives system information of the neighboring cell sent by the second transmission node through a Radio Resource Control (RRC) specific message.

In an embodiment, before the step in which the second transmission node sends the system information of the neighboring cell through the RRC specific information, the above-mentioned method further includes the step described below.

In step 21, the second transmission node receives system information reported by a third transmission node.

In an implementation, the step in which the second transmission node receives the system information reported by the third transmission node includes the step described below.

In step 31, the second transmission node receives the system information reported by the third transmission node through RRC specific signaling. The RRC specific signaling includes at least one of: an uplink specific control message, connection setup request information, UE assistant information, relay assistant information, IAB assistant information, or uplink transmission information.

In an embodiment, the system information reported by the third transmission node includes system information of a local cell of the third transmission node or system information of a neighboring cell of the third transmission node.

In an embodiment, the step in which the first transmission node performs the monitoring according to the configuration information includes the step described below.

In step 41, the first transmission node monitors the system information of the neighboring cell on a resource corresponding to the resource information according to the resource information.

In an implementation, the step in which the first transmission node performs the measurement according to the configuration information includes one of the steps described below.

In step S1, if a signal measurement result of a current cell of the first transmission node is higher than a preset threshold, the first transmission node does not perform the measurement on a cell that has a lower cell priority or a lower cell hierarchy than the current cell; if the signal measurement result of the current cell of the first transmission node is lower than the preset threshold, the first transmission node performs the measurement on the cell that has the lower cell priority or the lower cell hierarchy than the current cell.

In step S2, the first transmission node performs the measurement on a cell that has a higher cell priority or a higher cell hierarchy than a current cell.

In an embodiment, the second transmission node includes one of: an IAB, an IAB donor, a relay, a base station, a CU, or a DU. The third transmission node includes one of: an IAB, a relay, or a DU.

In an embodiment, the CU has the highest hierarchy, or the donor base station has the highest hierarchy.

In an embodiment, the method further includes one of the following steps: in the case where the first transmission node is an IAB node, the IAB node sends an obtained cell identity of an IAB donor to an Access and Mobility Management Function (AMF) through a next generation (NG) interface; in the case where an F1 Access Point (AP) connection is set up between an IAB node DU and an IAB donor CU, a type of an IAB node is indicated in an F1 setup message; or in the case where a control plane interface NG-C connection is set up between an IAB donor and an AMF, a type of an IAB node is indicated.

Figure 4:
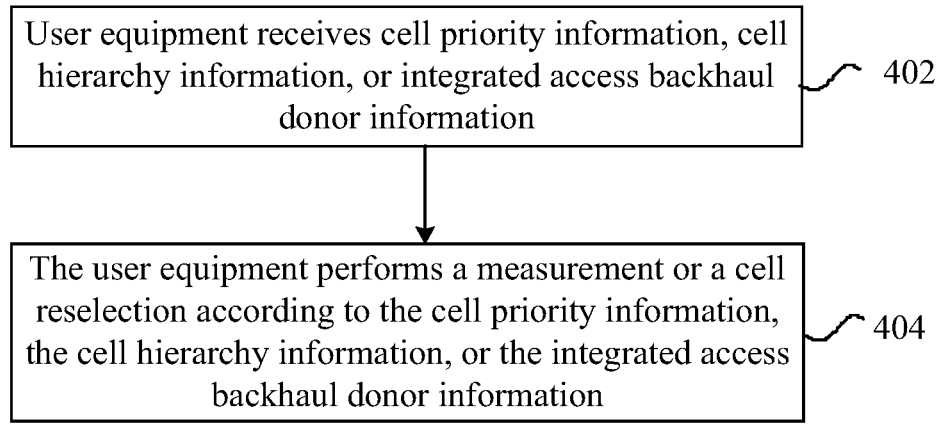
FIG. 4 is a flowchart of another access selection method according to an embodiment of the present disclosure.

In this embodiment, an access selection method executed on a user equipment is provided. FIG. 4 is a flowchart of another access selection method according to the embodiment of the present disclosure. As shown in FIG. 4, the process includes step 402 and step 404.

In the step 402, a UE receives cell priority information, cell hierarchy information, or IAB donor information.

In an embodiment, the cell priority information includes at least one of the following: cell priority information of a local cell, or cell priority information of a neighboring cell; and the cell hierarchy information includes at least one of the following: cell hierarchy information of the local cell, or cell hierarchy information of the neighboring cell.

In the step 404, the UE performs a measurement or a cell reselection according to the cell priority information, the cell hierarchy information, or the IAB donor information. The IAB donor information includes at least one of the following: the number of connection hops, a hierarchy, a path overhead, or load/congestion. In an embodiment, the IAB donor includes an IAB base station or an IAB donor DU.

Through the above-mentioned steps, the UE receives the cell priority information, the cell hierarchy information or the IAB donor information; the UE performs the measurement or the cell reselection according to the cell priority information, the cell hierarchy information, or the IAB donor information. The IAB donor information includes at least one of the following: the number of connection hops, the hierarchy, the path overhead, or the load/congestion. The IAB donor includes the IAB base station or the IAB donor DU. That is, the UE can perform the measurement or the cell reselection according to the cell priority information, the cell hierarchy information or the IAB donor information, thereby a large communication delay and a large overhead in an IAB multi-hop network in the related art due to the fact that there is no reasonable IAB selection method during a communications between the UE and a core network through multiple IABs are solved, and the effect of reducing the communication delay and the overhead is achieved.

In an embodiment, the step 402 and the step 404 may be executed in a reverse order, that is, the step 404 may be executed before the step 402.

In an implementation, the cell priority information or the cell hierarchy information is carried by system information or an RRC specific message.

In an embodiment, if the RRC specific message received by the UE includes the cell priority information or the cell hierarchy information, the UE ignores the cell priority information or the cell hierarchy information in the system information.

In an implementation, the step in which the UE performs the measurement according to the cell priority information or the cell hierarchy information includes one of the steps described below.

In step 61, if a signal measurement result of a current cell of the UE is higher than a preset threshold, the UE does not perform the measurement on a cell that has a lower cell priority or a lower cell hierarchy than the current cell; if the signal measurement result of the current cell of the UE is lower than the preset threshold, the UE performs the measurement on the cell that has the lower cell priority or the lower cell hierarchy than the current cell.

In step 62, the UE performs the measurement on a cell that has a higher cell priority or a higher cell hierarchy than the current cell.

In an embodiment, the step in which the UE performs the cell reselection according to the cell priority information or the cell hierarchy information includes the step described below.

In step 71, the UE performs the cell reselection on a cell that has higher cell priority information or cell hierarchy information than the current cell.

The step 71 may be implemented in the manners described below. The UE performing the cell reselection includes the following steps: the UE searches for a cell with the strongest signal on multiple frequencies, reads system information, and obtains cell hierarchy information and the like; then the UE selects a cell with the highest IAB hierarchy among all found suitable cells. Alternatively, the UE performing the cell reselection includes the following steps: the UE searches for a cell with the strongest signal on multiple frequencies, reads system information, obtains hierarchies of the cell and neighboring cells, finds the identities of cells with the highest cell hierarchy and performs detection, selects, among the cells, a cell with the strongest signal and meeting the suitable cell condition, and then selects the cell to camp on.

The embodiment will be illustrated in combination with instances and examples described below.

Instance One

Cell selection of a UE: if a scenario of a relay node is considered, from the perspective of reducing delay, the UE should select a relay node with a higher hierarchy as much as possible so that an IAB donor may be reached with a relative small number of hops, and the UE needs to learn hierarchy information of a cell before accessing the cell.

Example One

An IAB carries an IAB hierarchy identity in an MIB/System Information Block (SIB). If the IAB is an IAB donor, the hierarchy of the IAB donor is 0.

A UE may learn the hierarchy of the IAB after reading system information.

Alternatively, hierarchy information is not included in the MIB/SIB by the cell, but cell priority information is included. Generally, the higher the hierarchy of the cell, the higher the cell priority, but the hierarchy and the cell priority are not in one-to-one correspondence. The priority information of each cell may be determined by each cell itself or the IAB donor based on the hierarchy information and the current load or capability of each cell itself.

Therefore, the manner in which the UE selects a cell includes the steps described below.

In step 81, the UE searches for a cell with the strongest signal on multiple frequencies, reads SIB information, and obtains IAB hierarchy information or cell priority information, Public Land Mobile Network (PLMN) information and the like.

In step 82, the UE finds suitable cells meeting an s criterion according to a measurement result.

In step 83, the UE selects a cell with the highest IAB hierarchy or the highest cell priority information among all the suitable cells to access.

Example Two

In addition to carrying a hierarchy or a cell priority information identity of an IAB in an MIB/SIB by the IAB, if the IAB receives hierarchy or cell priority information of other surrounding IABs, the IAB may also broadcast the information through system information in the form of a neighboring cell hierarchy list, and a UE may store the information locally after receiving the information. This is conducive to that the UE does not need to read the system information of each cell in sequence to receive the hierarchy information or the cell priority information, so that a delay of a cell selection is reduced.

Therefore, the manner in which the UE selects a cell includes the steps described below.

In step 91, the UE searches for a cell with the strongest signal on multiple frequencies, reads SIB information, and obtains the cell hierarchy or the cell priority information of the IAB and the neighboring IAB.

In step 92, after learning cells with the highest IAB hierarchy or the highest cell priority information, the UE performs detection and selects the cell with the strongest signal from the cells. If the selected cell meets a suitable cell condition, the UE selects the cell to camp on. If the selected cell does not meet the suitable cell condition, the UE continues to select cells with the hierarchy or the cell priority information one level lower for performing detection. If the continuously selected cell meets the suitable cell condition, the UE selects the cell to camp on. If the continuously selected cell does not meet the suitable cell condition, the above-mentioned process continues, and so on.

Example Three

It is assumed that a UE has selected a cell to access, but the UE still needs to measure a neighboring cell. This step includes the steps described below.

In step 101, the UE receives cell priority information or cell hierarchy information.

The cell priority information or the cell hierarchy information at least includes: cell priority information or cell hierarchy information of the local cell; cell priority information or cell hierarchy information of the neighboring cell.

The cell priority information or the cell hierarchy information is carried by system information or an RRC specific message.

If the RRC message received by the UE includes the cell priority information or the cell hierarchy information, the UE may ignore cell priority information or cell hierarchy information in the system information.

In step 102, the UE performs a measurement according to the cell priority information or the cell hierarchy information. This step includes the step described below.

If a signal measurement result of a current cell of the UE is higher than a given threshold, the UE does not perform the measurement on a cell that has a lower cell priority or a lower cell hierarchy than the current cell; if the signal measurement result of the current cell of the UE is not higher than the given threshold, the UE performs the measurement on the cell that has the lower cell priority or the lower cell hierarchy than the current cell.

The UE performs the measurement on a cell that has higher cell priority information or cell hierarchy information than the current cell.

Alternatively, the UE performs cell reselection estimation on a cell that has higher cell priority information or higher cell hierarchy information than the current cell.

Instance Two

It is assumed that IAB relays are hierarchical, and an IAB of each hierarchy is only connected to all or a part of IABs of the same hierarchy and an IAB of one hierarchy higher. It is assumed that the hierarchy of a donor IAB is 0 and that the hierarchy of the IAB that the UE accesses is N, then a transmission path between a core network and the UE is to sequentially pass through the IABs of hierarchies 1, 2, . . . , N. It is assumed that a process of setting up a connection between IABs is similar to a process of setting up a connection between a UE and a base station, then an IAB of hierarchy (n+1) is a UE for an IAB of hierarchy n, and the IAB of hierarchy n is a base station for the IAB of hierarchy n+1. If the IAB of hierarchy (n+1) accesses the IAB of hierarchy n through a Uu port in the way of a UE, the IAB of hierarchy n is referred to as a parent node of the IAB of hierarchy (n+1).

In this embodiment, it is described that how to select a parent IAB node as a serving cell of an IAB when the IAB initially works.

Selection of a parent IAB node/donor by an IAB is different from conventional cell selection/reselection by a UE. A determination threshold used by the UE during cell selection/reselection only needs to ensure basic coverage. However, when an IAB node selects a parent IAB node/donor, the channel quality of the IAB node and the channel quality of the parent IAB node/donor are hoped to be not too poor. Therefore, it is considered that a selection threshold Th1 of the parent IAB node is defined. When the IAB node detects that Reference Signal Receiving Power (RSRP)/Reference Signal Receiving Quality (RSRQ) in a measurement result of a link between the IAB node and a neighbor IAB node/donor is greater than Th1, the neighbor IAB node/donor is used as a candidate parent IAB node/donor.

In step 111, the parent IAB node sends system information. The system information includes an IAB selection threshold, an IAB reselection offset, an IAB donor identity, priority information or cell hierarchy information, PLMN of the IAB donor, etc.

The hierarchy information of the IAB identifies the number of hops from the IAB to the IAB donor.

In step 112, when the IAB detects, based on the IAB selection threshold, that the measurement result of the link between the IAB and the neighbor IAB node/donor is greater than the IAB selection threshold, the IAB is used as a candidate parent node.

Alternatively, when the IAB detects, based on the IAB reselection offset information, that the difference between the measurement result of the link between the IAB and the neighbor IAB node/donor and a measurement result of the currently selected parent node is greater than the IAB selection threshold, the IAB is used as a candidate reselection parent node.

In an embodiment, if the system information sent by the parent IAB node includes hierarchy information or cell priority information, the manner in which the IAB selects the parent node includes the steps described below.

In step 121, the IAB searches for a cell with the strongest signal on multiple frequencies, reads SIB information, and obtains hierarchy information or cell priority information of the IAB, PLMN information, etc.

In step 122, the IAB finds suitable cells meeting an s criterion according to the measurement result.

In step 123, the IAB selects a cell with the highest IAB hierarchy or the highest cell priority information among all the suitable cells to access.

In an embodiment, if the IAB has selected a parent node as a serving cell, a measurement operation is still to be performed. This step includes the steps described below.

In step 141, the IAB receives configuration information of a neighboring cell. The configuration information includes cell priority or cell hierarchy, and measurement configuration information.

In step 142, the IAB performs the measurement according to the configuration information. This step includes the step described below.

If a signal measurement result of a current cell of the IAB is higher than a threshold in the measurement configuration information, the IAB does not perform a measurement on a cell that has a lower cell priority or a lower cell hierarchy than the current cell. If the signal measurement result of the current cell of the IAB is not higher than the threshold in the measurement configuration information, the IAB performs the measurement on the cell that has the lower cell priority or the lower cell hierarchy than the current cell.

The IAB performs the measurement on a cell that has higher cell priority information or higher cell hierarchy information than the current cell.

Instance Three

Cell selection of an IAB is similar to cell selection of a UE, and a parent IAB of a higher hierarchy is preferentially selected, so that an IAB donor may be reached with a relative small number of hops. Before a UE accesses a cell, the UE needs to learn hierarchy information of the cell and whether information about the IAB is supported. In addition, the IAB further needs to consider information of a current load of a node of one hierarchy higher, so as to avoid frequent congestion caused by accessing a high-load IAB. Alternatively, when the IAB has relative high load currently or has been connected to multiple other IABs as lower-hierarchy IABs, the IAB may decide not to access a new IAB, and then IAB barred indication information may also be added into an MIB, where the IAB barred indication information is used for indicating that access to an IAB is barred but access to an ordinary UE is not barred.

In an embodiment, the IAB carries IAB access barred indication information in system information. When the UE detects the system information, the indication information is ignored, and when the IAB detects the message, the IAB is not used as a candidate reselection cell.

Alternatively, the parent IAB node/donor sends access-control-related information to indicate whether a new IAB node access is allowed. The reason for performing the access control may be operation control, or consideration of a traffic situation or consideration of a congestion situation or bandwidth of the backhaul link. In an embodiment, the congestion situation of the backhaul link may be embodied in terms of an air interface resource occupancy ratio, a bandwidth, an idle bandwidth, spectral efficiency, etc. In an embodiment, on a multi-hop path, the data transmission that a newly accessed IAB node can achieve is often limited by a bottleneck link on the multi-hop path to the donor, that is, a particular hop that has the lowest channel quality, provides the lowest throughput, or is the most congested. Based on this, the congestion situation of the bottleneck link to a particular IAB donor may be broadcast by the parent IAB node. In addition, the information about remaining bandwidth and throughput of the IAB donor wireline link may be broadcast for selecting a parent IAB node/donor by the IAB node.

Alternatively, the network side allocates a specific access identity or access level to the IAB, and a set of IAB-specific access parameters is allocated based on the access identity or the access level and are sent through system information. The IAB which receives the access parameters performs an access control operation based on the parameters.

In an embodiment, it is assumed that IAB1 is a parent node of IAB2.

In step 151, the IAB2 receives system information of the parent node IAB1. The system information includes: the IAB access barred indication information, or the IAB-specific access control parameters, or congestion situation of the backhaul link or bandwidth information of the backhaul link.

In an embodiment, the congestion situation of the backhaul link may be embodied in terms of an air interface resource occupancy ratio, a bandwidth, an idle bandwidth, spectral efficiency, etc. In an embodiment, on a multi-hop path, the data transmission that a newly accessed IAB node can achieve is often limited by a bottleneck link on the multi-hop path to the donor, that is, a particular hop that has the lowest channel quality, provides the lowest throughput, or is the most congested. Therefore, the congestion situation of the bottleneck link to a particular IAB donor may be broadcast by the parent IAB node. In addition, the information about the remaining bandwidth and throughput of an IAB donor wireline link may be broadcast for selecting a parent IAB node/donor by the IAB node.

In step 152, the IAB performs an access control operation based on the received information.

Instance Four

When an IAB accesses other IABs, for a Time Division Duplex (TDD) system, all slots during execution of random access may be set as X symbols through tdd-Up-link (UL)-Down-link (DL)-Configuration Common, the service of access to a UE is suspended, a preamble is sent according to a random access resource position broadcast by a higher-hierarchy IAB, message 2 is monitored within a random access response window, message 3 is sent after a resource of the message 3 is obtained, and monitoring is continued to wait for receiving message 4.

To reduce the impact on a serving UE, the IAB needs to shorten the delay of the random access. Therefore, the parent node of the IAB may configure the IAB with a smaller resource of IAB sending the preamble different from a resource of the UE, resource information of IAB receiving the message 2 or the message 4, a size of an IAB random access response window, random access conflict resolution time. The higher-hierarchy IAB preferentially responds to the IAB.

In an embodiment, it is assumed that IAB1 is the parent node of IAB2.

In step 161, IAB2 receives system information of the parent node TAB'. The system information includes an IAB random access parameter.

In an embodiment, the IAB random access parameter includes: a resource of IAB sending a preamble, resource information of IAB receiving message 2 or message 4, a size of an IAB random access response window, random access conflict resolution time.

In step 162, the IAB performs a random access operation based on the received information.

Instance Five

It is assumed that IAB1 is the parent node of IAB2.

In step 171, IAB1 sends resource configuration information of a neighboring cell.

In an embodiment, IAB1 sends system information of the neighboring cell through RRC specific information. The RRC specific information includes, but is not limited to, an RRC reconfiguration message.

The resource configuration information at least includes: resource information about communications between the first transmission node and a terminal, resource information about communications between the first transmission node and a second transmission node, resource information about sending system information by the first transmission node.

In an embodiment, the resource information includes: time resource information, frequency domain resource information, space resource information. In an embodiment, the time resource information includes: a sub-frame offset and a sub-frame period, a symbol offset and a symbol period, a slot offset and a slot period. The frequency domain resource information includes: carrier index information, bandwidth part index indication information, resource block index indication information. The space resource information includes: beam index indication information, beam direction indication information.

IAB1 includes one of: an IAB, an IAB donor, a relay, a base station, a CU or a DU.

IAB2 includes one of: an IAB, a relay or a DU.

In step 172, IAB2 receives resource configuration information of a neighboring cell sent by IAB1.

In step 173, IAB2 node monitors the system information of the neighboring cell on a resource position according to the resource configuration information.

Instance Six

Figure 5:
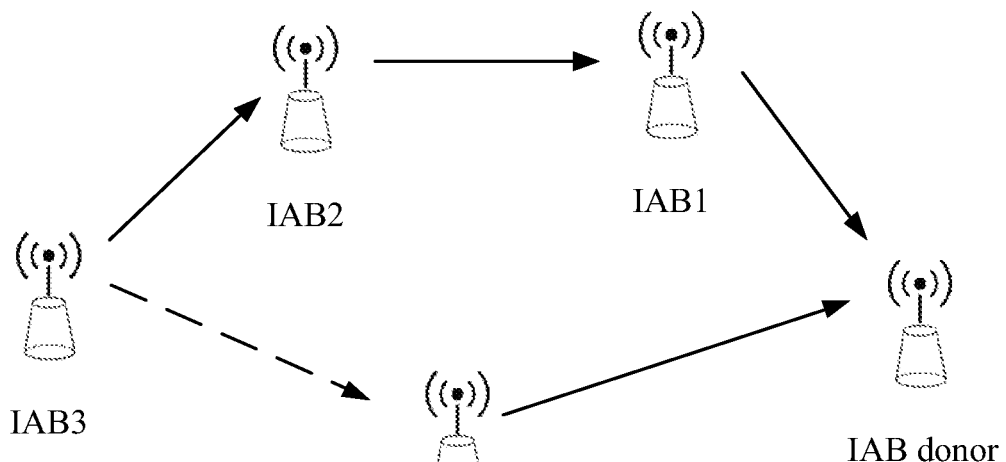
FIG. 5 is a schematic diagram of another access selection method according to an embodiment of the present disclosure.

As shown in FIG. 5, it is assumed that an IAB donor is a parent node of IAB1 and has a hierarchy of 0. It is assumed that IAB1 is a parent node of IAB2, that IAB2 is a parent node of IAB3, and that at one moment, an IAB numbered X (IAB-X) newly accesses the network and has a hierarchy of 1.

In step 181, IAB-X reports system information of IAB-X itself to the IAB donor through RRC specific signaling. The RRC specific signaling may include: an Uplink Dedicated Control Channel Message (UL-DCCH-Message), connection setup request information, UE assistance information, relay assistance information, IAB assistance information, uplink information transmission.

In step 182, after the IAB donor receives the system information of IAB-X, the IAB donor sends the system information of IAB-X to the child node IAB1 through RRC specific signaling. The RRC specific signaling may include: an RRC reconfiguration message, relay or IAB control information.

In step 183, after IAB1 receives the system information of IAB-X, IAB1 sends the system information of IAB-X to the child node IAB2 through RRC specific signaling.

In step 184, after IAB2 receives the system information of IAB-X, IAB2 sends the system information of IAB-X to the child node IAB3 through RRC specific signaling.

Subsequently, when the system information of IAB-X is updated, other IABs may also be notified through the process of above-mentioned steps 181 to 184.

Through the above process, IAB1, IAB2 and IAB3 all learn the system information of IAB-X, and IAB1, IAB2 and IAB3 all may perform a measurement on IAB-X according to a measurement configuration.

In an embodiment, if the system information of IAB-X carries cell priority information or cell hierarchy information, or if IAB-X reports a cell priority or a cell hierarchy of IAB-X itself to the IAB donor, the IAB donor may send the cell priority or cell hierarchy information of IAB-X hierarchy by hierarchy.

For IAB3, since the hierarchy of the cell currently accessed by IAB3 is 2, IAB3 needs to perform a measurement on IAB-X.

For IAB1 and IAB3, measurement is performed on IAB-X only if a signal measurement result of the cell is lower than a given threshold, and measurement is not performed if the signal measurement result of the cell is not lower than the given threshold.

Instance Seven

In step 191, when the IAB node accesses the parent node in a way of a UE, the IAB node monitors system information to obtain the cell identity of the IAB donor.

In step 192, the IAB node sends the obtained cell identity of the IAB donor to an AMF through an NG interface.

In step 193, the AMF sends an Internet Protocol (IP) address of the IAB donor to the IAB node.

In addition, when an F1 AP connection is set up between the IAB node DU and the IAB donor CU, a type of the IAB node may be indicated in an F1 setup message. Similarly, when an NG-C connection is set up between the IAB donor and the AMF, the type of the IAB node may also be indicated.

According to the descriptions of the above-mentioned implementations, it may be understood clearly by those skilled in the art that the method of the embodiment described above may be implemented by means of software plus a general-purpose hardware platform, or may be implemented by hardware. Based on this understanding, the technical scheme of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method of one or more embodiments of the present disclosure.

Embodiment Two

This embodiment provides an access selection apparatus. The apparatus is configured to implement the above-mentioned embodiment and implementations. What has been described will not be repeated. As used below, the term "module" may be software, hardware or a combination of software and hardware capable of implementing predetermined functions. The apparatus described below in the embodiment may be implemented by software, but implementation by hardware or by a combination of software and hardware is also possible and conceived.

Figure 6:
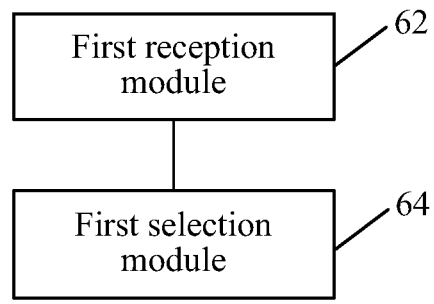
FIG. 6 is a structural block diagram of an access selection apparatus according to an embodiment of the present disclosure.

FIG. 6 is a structural block diagram of an access selection apparatus according to an embodiment of the present disclosure. The access selection apparatus is applied to a transmission node. As shown in FIG. 6, the apparatus includes a first reception module 62 and a first selection module 64.

The first reception module 62 is configured to receive configuration information of one of a parent node or a neighboring cell.

In an embodiment, the configuration information includes at least one of the following: cell priority information, cell hierarchy information used for indicating the number of hops for reaching an IAB donor, system information, resource configuration information, cell access information, cell selection information, IAB donor information, or IAB information. The IAB donor includes an IAB base station or an IAB donor DU. The IAB donor information or the IAB information includes at least one of the following: the number of connection hops, a hierarchy, a path overhead, a load, congestion, an air interface resource occupancy ratio, a bandwidth, an idle bandwidth, spectral efficiency, or information about remaining bandwidth and throughput of an IAB donor wireless link. The system information includes at least one of the following: an MIB, minimum SI, an IAB selection threshold, an IAB reselection offset, an IAB donor identity, the cell priority information, the cell hierarchy information, an IAB access control parameter, an IAB random access parameter, or an IAB access barred indication. The IAB access control parameter includes: an IAB-specific control parameter configured based on one of an IAB-specific access identity or an IAB-specific access level. The IAB random access parameter includes: a resource for IAB sending a preamble, resource information of IAB receiving message 2 or message 4, a size of an IAB random access response window, random access conflict resolution time. The cell access information includes at least one of the following: the cell priority information or the cell hierarchy information used for indicating the number of hops for reaching the IAB donor. The cell selection information includes at least one of the following: an IAB selection threshold, an IAB reselection offset, or an IAB donor identity. The IAB donor identity includes: a base station identity (gNB ID), an NGCI, a PCI, a DU ID. The IAB selection threshold includes: a cell measurement selection threshold, a beam measurement selection threshold. The resource configuration information includes at least one of the following: resource information about communications between the first transmission node and a terminal, resource information about communications between the first transmission node and a second transmission node, or resource information about sending system information by the first transmission node.

In an embodiment, the resource information includes at least one of: time resource information, frequency domain resource information, or space resource information. The time resource information includes at least one of the following: a sub-frame offset and a sub-frame period, a symbol offset and a symbol period, or a slot offset and a slot period. The frequency domain resource information includes at least one of: carrier index information, bandwidth part index indication information, or resource block index indication information. The space resource information includes at least one of: beam index indication information or beam direction indication information.

The first selection module 64 is configured to perform a measurement, monitoring, or a selection on an accessed parent node according to the configuration information.

Through the apparatus shown in FIG. 6, the configuration information of one of the parent node or the neighboring cell is received, and the measurement, the monitoring, or the selection is performed on the accessed parent node according to the configuration information. That is, the accessed parent node is selected according to the received configuration information, thereby a large communication delay and a large overhead in an IAB multi-hop network in the related art due to the fact that there is no reasonable IAB selection method during a communication between a UE and a core network through multiple IABs are solved, and the effect of reducing communication delay and overhead is achieved.

In an embodiment, the first transmission node includes, but is not limited to, an IAB, a relay, or a DU.

In an implementation, the hierarchy of the second transmission node is higher than the hierarchy of the first transmission node; or the second transmission node is a parent node of the first transmission node; or the second transmission node is a serving cell of the first transmission node.

In an embodiment, the first reception module 62 is further configured to receive system information of the neighboring cell sent by the second transmission node through an RRC specific message.

In an embodiment, before the second transmission node sends the system information of the neighboring cell through the RRC specific information, the operation in which the second transmission node receives system information reported by a third transmission node is further included. The operation in which the second transmission node receives the system information reported by the third transmission node includes the following operation: the second transmission node receives the system information reported by the third transmission node through RRC specific signaling. The RRC specific signaling includes at least one of the following: an uplink specific control message, connection setup request information, UE assistance information, relay assistance information, IAB assistance information, or uplink transmission information.

In an embodiment, the system information reported by the third transmission node includes system information of a local cell of the third transmission node or system information of a neighboring cell of the third transmission node.

In an embodiment, the first selection module 64 is further configured to monitor the system information of the neighboring cell on a resource according to the resource information.

In an implementation, the first selection module 64 is further configured to: if a signal measurement result of a current cell of the first transmission node is higher than a preset threshold, not perform a measurement on a cell that has a lower cell priority or a lower cell hierarchy than the current cell; and if the signal measurement result of the current cell of the first transmission node is lower than the preset threshold, perform the measurement on the cell that has the lower cell priority or the lower cell hierarchy than the current cell. Alternatively, the first selection module 64 is further configured to perform the measurement on a cell that has a higher cell priority or a higher cell hierarchy than the current cell.

In an embodiment, the second transmission node includes one of: an IAB, an IAB donor, a relay, a base station, a CU, or a DU. The third transmission node includes one of: an IAB, a relay, or a DU.

In an embodiment, the CU has the highest hierarchy, or the donor base station has the highest hierarchy.

In an embodiment, in the case where the first transmission node is an IAB node, the IAB node sends an obtained cell identity of an IAB donor to an AMF through an NG interface; or in the case where an F1 AP connection is set up between an IAB node DU and an IAB donor CU, a type of the IAB node is indicated in an F1 setup message; or in the case where an NG-C connection is set up between an IAB donor and an AMF, a type of the IAB node is indicated.

This embodiment further provides an access selection apparatus. The apparatus is configured to implement the above-mentioned embodiments and implementations. What has been described will not be repeated. As used below, the term "module" may be software, hardware or a combination of software and hardware capable of implementing predetermined functions. The apparatus described below in the embodiment may be implemented by software, but implementation by hardware or by a combination of software and hardware is also possible and conceived.

Figure 7:
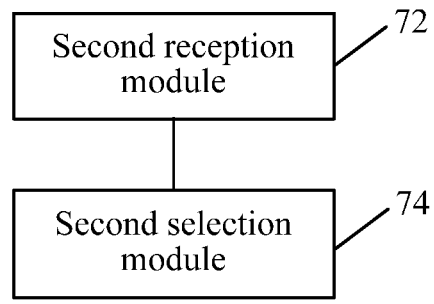
FIG. 7 is a structural block diagram of another access selection apparatus according to an embodiment of the present disclosure.

FIG. 7 is a structural block diagram of another access selection apparatus according to an embodiment of the present disclosure. The access selection apparatus is applied to a UE. As shown in FIG. 7, the apparatus includes a second reception module 72 and a second selection module 74.

The second reception module 72 is configured to receive cell priority information, cell hierarchy information, or IAB donor information.

In an embodiment, the cell priority information includes at least one of the following: cell priority information of a local cell, or cell priority information of a neighboring cell; and the cell hierarchy information includes at least one of the following: cell hierarchy information of the local cell, or cell hierarchy information of the neighboring cell.

The second selection module is configured to perform a measurement or a cell reselection according to the cell priority information, the cell hierarchy information, or the IAB donor information. The IAB donor information includes at least one of the following: the number of connection hops, a hierarchy, a path overhead, or a load/congestion. The IAB donor includes an IAB base station or an IAB donor DU.

Through the apparatus shown in FIG. 7, the UE receives the cell priority information, the cell hierarchy information, or the IAB donor information. The UE performs the measurement or the cell reselection according to the cell priority information, the cell hierarchy information, or the IAB donor information. The IAB donor information includes at least one of the following: the number of connection hops, the hierarchy, the path overhead, or the load/congestion. The IAB donor includes the IAB base station or the IAB donor DU. That is, the UE may perform the measurement or the cell reselection according to the cell priority information, the cell hierarchy information or the IAB donor information, thereby a large communication delay and a large overhead in an IAB multi-hop network in the related art due to the fact that there is no reasonable IAB selection method during a communication between a UE and a core network through multiple IABs are solved, and the effect of reducing communication delay and overhead is achieved.

In an implementation, the cell priority information or the cell hierarchy information is carried by system information or an RRC specific message.

In an embodiment, if the RRC specific message received by the UE includes the cell priority information or the cell hierarchy information, the UE ignores cell priority information or cell hierarchy information in the system information.

In an implementation, the second selection module 74 is further configured to: in the case where a signal measurement result of a current cell of the UE is higher than a preset threshold, not perform a measurement on a cell that has a lower cell priority or a lower cell hierarchy than the current cell; and in the case where the signal measurement result of the current cell of the UE is lower than the preset threshold, perform the measurement on the cell that has the lower cell priority or the lower cell hierarchy than the current cell.

Alternatively, the second selection module 74 is further configured to perform the measurement on a cell that has a higher cell priority or a higher cell hierarchy than the current cell.

In an embodiment, the second selection module 74 is further configured to perform a cell reselection on the cell that has higher cell priority information or higher cell hierarchy information than the current cell.

One or more modules described above may be implemented by software or hardware. Implementation by hardware may be, but may not be limited to being, performed in the following manners: the one or more modules described above are located in the same processor or multiple modules described above are located in different processors in any combination form.

Embodiment Three

This embodiment of the present disclosure further provides a storage medium. The storage medium is configured to store a computer program. The computer program is configured to, when executed, perform the method of any one of the above-mentioned embodiments.

In this embodiment, the storage medium may be configured to store a computer program for performing the steps described below.

In S1, a first transmission node receives configuration information of one of a parent node or a neighboring cell.

In S2, the first transmission node performs a measurement, monitoring, or a selection on an accessed parent node according to the configuration information.

In an embodiment, the storage medium is further configured to store a computer program for performing the steps described below.

In S1, a UE receives cell priority information, cell hierarchy information, or IAB donor information.

In S2, the UE performs a measurement or a cell reselection according to the cell priority information, the cell hierarchy information, or the IAB donor information. The IAB donor information includes at least one of the following: the number of connection hops, a hierarchy, a path overhead, or a load/congestion. The IAB donor includes an IAB base station or an IAB donor DU.

In this embodiment, the above-mentioned storage medium may include, but is not limited to, a Universal Serial Bus Flash Disk, an ROM, an RAM, a mobile hard disk, a magnetic disk, an optical disk or another medium capable of storing a computer program.

Figure 8:
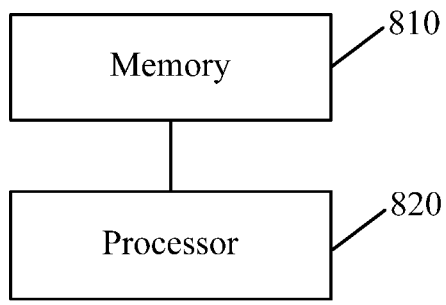
FIG. 8 is a structural diagram of an electronic apparatus according to an embodiment of the present disclosure.

An embodiment of the present disclosure further provides an electronic apparatus. As shown in FIG. 8, the electronic apparatus includes a memory 810 and a processor 820. The memory 810 is configured to store a computer program, and the processor 820 is configured to execute the computer program to perform the method of any embodiment described above.

In an embodiment, the electronic apparatus may further include a transmission device and an input and output device. The transmission device is connected to the processor 820, and the input and output device is connected to the processor 820.

In this embodiment, the processor 820 may be configured to perform the steps described below through a computer program.

In S1, a first transmission node receives configuration information of one of a parent node or a neighboring cell.

In S2, the first transmission node performs a measurement, monitoring, or a selection on an accessed parent node according to the configuration information.

In an embodiment, the processor 820 is further configured to store a computer program for performing the steps described below.

In S1, a UE receives cell priority information, cell hierarchy information, or IAB donor information.

In S2, the UE performs a measurement or a cell reselection according to the cell priority information, the cell hierarchy information, or the IAB donor information. The IAB donor information includes at least one of the following: the number of connection hops, a hierarchy, a path overhead, or a load/congestion. The IAB donor includes an IAB base station or an IAB donor DU.

For the examples in this embodiment, reference may be made to the examples described in the above embodiments and implementations, and the examples will not be repeated in this embodiment.

Those skilled in the art should understand that one or more modules or one or more steps described above of the present disclosure may be implemented by a general-purpose computing apparatus, the one or more modules or the one or more steps may be concentrated on a single computing apparatus or distributed on a network composed of multiple computing apparatuses. In an embodiment, the one or more modules or the one ore more steps may be implemented by program codes executable by the computing apparatus, so that the one or more modules or the one ore more steps may be stored in a storage apparatus for performing by the computing apparatus, and in some cases, the illustrated or described steps may be performed in sequences different from those described herein, or the one more modules or the one or more steps may be made into one or more integrated circuit modules separately, or multiple modules or steps therein may be made into a single integrated circuit module for implementation. In this way, the present disclosure is not limited to any specific combination of hardware and software.

What is claimed is:

1. An access selection method, comprising:
   receiving, by a first transmission node from a parent node, configuration information of one of the parent node or a neighboring cell, wherein the first transmission node is an integrated access backhaul (IAB) node;
   wherein the configuration information comprises at least one of:
   system information, wherein the system information comprises at least one of an IAB random access parameter comprising a size of an IAB random access response window, or an IAB access barred indication used for indicating that an access of an IAB node is barred and an access of an ordinary UE is not barred; or
   cell selection information, wherein the cell selection information comprises at least one of an IAB selection threshold, or an IAB reselection offset; and
   performing, by the first transmission node, a measurement, monitoring, or a selection on an accessed parent node according to the configuration information.

2. The method according to claim 1, wherein the IAB donor ID comprises at least one of: a base station identity (gNB ID), or a Distributed Unit (DU) ID; and the IAB selection threshold comprises at least one of: a cell measurement selection threshold, or a beam measurement selection threshold.

3. The method according to claim 1, wherein the configuration information comprises: resource configuration information, wherein the resource configuration information comprises: resource information about communications between the first transmission node and a terminal, and resource information about communications between the first transmission node and a second transmission node, wherein the second transmission node is a parent node of the first transmission node, or the second transmission node is a serving cell of the first transmission node.

4. The method according to claim 1, wherein the resource information comprises at least one of: time resource information, frequency domain resource information, or space resource information; wherein
the time resource information comprises at least one of the following: a sub-frame offset and a sub-frame period, a symbol offset and a symbol period, or a slot offset and a slot period;
the frequency domain resource information comprises at least one of the following: carrier index information, bandwidth part index indication information, or resource block index indication information;
the space resource information comprises at least one of the following: beam index indication information or beam direction indication information.

5. The method according to claim 1, wherein receiving, by the first transmission node, the configuration information of the neighboring cell comprises:
receiving, by the first transmission node, system information of the neighboring cell sent by a second transmission node through a Radio Resource Control (RRC) specific message.

6. The method according to claim 5, wherein before the second transmission node sends the system information of the neighboring cell through the RRC specific message, the method further comprises:
receiving, by the second transmission node, system information reported by a third transmission node;
wherein receiving, by the second transmission node, the system information reported by the third transmission node comprises:
receiving, by the second transmission node, the system information reported by the third transmission node through RRC specific signaling;
wherein the RRC specific signaling comprises at least one of the following: an uplink specific control message, connection setup request information, User Equipment (UE) assistance information, relay assistance information, IAB assistance information, or uplink transmission information.

7. The method according to claim 6, wherein the system information reported by the third transmission node comprises: system information of a local cell of the third transmission node or system information of a neighboring cell of the third transmission node.

8. The method according to claim 4, wherein performing, by the first transmission node, the monitoring according to the configuration information comprises:
monitoring, by the first transmission node according to the resource information, system information of the neighboring cell on a resource corresponding to the resource information.

9. The method according to claim 1, wherein performing, by the first transmission node, the measurement according to the configuration information comprises one of the following:
in a case where a signal measurement result of a current cell of the first transmission node is higher than a preset threshold, not performing, by the first transmission node, the measurement on a cell that has a lower cell priority or a lower cell hierarchy than the current cell;
in a case where the signal measurement result of the current cell of the first transmission node is lower than the preset threshold, performing, by the first transmission node, the measurement on the cell that has the lower cell priority or the lower cell hierarchy than the current cell; or
performing, by the first transmission node, the measurement on a cell that has a higher cell priority or a higher cell hierarchy than a current cell.

10. The method according to claim 1, further comprising one of the following:
in a case where the first transmission node is an IAB node, sending, by the IAB node, an obtained cell identity of an IAB donor to an Access and Mobility Management Function (AMF) through a next generation (NG) interface;
in a case where an F1 Access Point (AP) connection is set up between an IAB node DU and an IAB donor CU, indicating a type of an IAB node in an F1 setup message; or
in a case where a control plane interface NG-C connection is set up between an IAB donor and an AMF, indicating a type of an IAB node.

11. A storage medium, which is configured to store a computer program, wherein the computer program is configured to, when executed, perform the method of claim 1.

12. An electronic apparatus, comprising a memory and a processor, wherein the memory is configured to store a computer program, and the processor is configured to execute the computer program to perform the method of claim 1.

13. The method according to claim 1, wherein when the parent node is a non-IAB donor node and the configuration information comprises the system information, the system information further comprises an IAB donor identity (ID); and when the parent node is the non-IAB donor node and the configuration information comprises the cell selection information, the cell selection information further comprises the IAB donor ID.

14. An access selection apparatus, applied to a transmission node, and comprising:
a reception module, which is configured to receive, from a parent node, configuration information of one of the parent node or a neighboring cell, wherein the first transmission node is an integrated access backhaul (IAB) node;
wherein the configuration information comprises at least one of:
system information, wherein the system information comprises at least one of an IAB random access parameter comprising a size of an IAB random access response window, or an IAB access barred indication used for indicating that an access of an IAB node is barred and an access of an ordinary UE is not barred; or
cell selection information, wherein the cell selection information comprises at least one of an IAB selection threshold, or an IAB reselection offset; and a selection module, which is configured to perform a measurement, monitoring, or a selection on an accessed parent node according to the configuration information.

\* \* \* \* \*